United States Patent
Cui et al.

(10) Patent No.: US 12,341,270 B2
(45) Date of Patent: Jun. 24, 2025

(54) APERTURE-SHARED DUAL-WIDEBAND ANTENNA AND ITS DESIGN METHOD

(71) Applicant: South China University of Technology, Guangdong (CN)

(72) Inventors: Yuehui Cui, Guangdong (CN); Guoyan Shen, Guangdong (CN); Quan Xue, Guangdong (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 175 days.

(21) Appl. No.: 18/204,942

(22) Filed: Jun. 1, 2023

(65) Prior Publication Data
US 2023/0318188 A1 Oct. 5, 2023

Related U.S. Application Data

(63) Continuation of application No. PCT/CN2021/124829, filed on Oct. 20, 2021.

(30) Foreign Application Priority Data

Dec. 4, 2020 (CN) .......................... 202011407988.5

(51) Int. Cl.
*H01Q 9/04* (2006.01)
*H01Q 5/15* (2015.01)
*H01Q 5/47* (2015.01)

(52) U.S. Cl.
CPC ............. *H01Q 9/0485* (2013.01); *H01Q 5/15* (2015.01); *H01Q 5/47* (2015.01)

(58) Field of Classification Search
CPC .......... H01Q 9/0485; H01Q 5/47; H01Q 5/42; H01Q 15/0086; H01Q 5/28; H01Q 1/38; H01Q 19/108
See application file for complete search history.

(56) References Cited

U.S. PATENT DOCUMENTS

2005/0225492 A1 10/2005 Metz
2009/0273527 A1 11/2009 Behdad
(Continued)

FOREIGN PATENT DOCUMENTS

CN 108199134 A 6/2018
CN 108232458 A 6/2018
(Continued)

OTHER PUBLICATIONS

Yue Qin et al., Embeddable Structure for Reducing Mutual Coupling in Massive MIMO Antennas, IEEE Access, Oct. 26, 2020, pp. 195102-195112, vol. 8.
(Continued)

*Primary Examiner* — Graham P Smith
(74) *Attorney, Agent, or Firm* — LOZA & LOZA, LLP; Michael Fedrick (57) ABSTRACT

An aperture-sharing method for a dual-band aperture-shared antenna. By means of the method, a first dielectric substrate is arranged directly above a floor, a second dielectric substrate is arranged between the floor and the first dielectric substrate; a first meta surface, a first radiation ring, a second radiation ring and a second meta surface are arranged in a first quadrant to a fourth quadrant of the top surface of the first dielectric substrate; a fourth radiation ring, a fourth meta surface, a third meta surface and a third radiation ring are arranged in a first quadrant to a fourth quadrant of the bottom surface of the first dielectric substrate; first high-frequency antenna elements are symmetrically arranged on the top surface of the second dielectric substrate; and second high-frequency antenna elements are symmetrically arranged on the bottom surface of the second dielectric substrate. Further disclosed is a dual-band aperture-shared antenna structure.

10 Claims, 9 Drawing Sheets

(56) References Cited

U.S. PATENT DOCUMENTS

| | | | |
|---|---|---|---|
| 2019/0036226 A1* | 1/2019 | Ding | H01Q 19/108 |
| 2023/0039854 A1* | 2/2023 | Cao | H01Q 13/103 |

FOREIGN PATENT DOCUMENTS

| | | | | |
|---|---|---|---|---|
| CN | 208862156 U | | 5/2019 | |
| CN | 110112578 A | | 8/2019 | |
| CN | 110148833 A | | 8/2019 | |
| CN | 213401512 U | * | 6/2021 | ............. H01Q 1/002 |
| CN | 114464989 A | * | 5/2022 | |

OTHER PUBLICATIONS

Yuehui Cui et al., A Tri-Band SIW-Cavity Backed Differentially Fed Dual-Polarized Slot Antenna for WiFi/5G Applications, 2020, pp. 1-6.

* cited by examiner

APERTURE-SHARED DUAL-WIDEBAND ANTENNA AND ITS DESIGN METHOD

CROSS REFERENCE TO RELATED APPLICATIONS

The present application is a Continuation Application of PCT Application No. PCT/CN2021/124829 filed on Oct. 20, 2021, which claims the benefit of Chinese Patent Application No. 202011407988.5 filed on Dec. 4, 2020. All the above are hereby incorporated by reference in their entirety.

FIELD OF THE INVENTION

The present disclosure relates to the technical field of antennas, and in particular, to the design method and structure of an aperture-shared dual-wideband antenna.

BACKGROUND OF THE INVENTION

With the development of wireless communication technology, antenna systems face challenges of more frequency bands, larger scales, multi functions, and multi standards. Base station antennas are required to be miniaturized and lightweight due to difficulties in site selection and limited installation space. In response to these challenges and requirements, there is an urgent need to study multi-band aperture-shared antennas. The evolution of wireless communication technology and the development of mobile communication systems is a gradual process. There is a long-term situation of multi-system cooperation. At present, 2G (the second-generation mobile communication) systems, 3G (the third-generation mobile communication) systems, 4G/LTE (the fourth-generation mobile communication/long-term evolution technology), and 5G (the fifth-generation mobile communication) systems coexist and cooperate with each other, which requires base station antennas operating in different frequency bands to be accommodated over one reflector, sharing the same aperture. At the same time, with the development of mobile communication systems, 2G, 3G, and other systems will be gradually cleared, some frequency bands may be released for 5G or B5G systems. In addition, new frequency bands may be authorized for mobile communications in the future. Thus, the study of multi-band aperture-shared antennas provides an important approach for the future antenna systems to deal with the challenges.

The arrangements of multi-band aperture-shared antennas can be mainly classified into following categories: a parallel coplanar arrangement, an interleaved arrangement, an interplanted arrangement, and a stacked arrangement. The parallel coplanar arrangement is an arrangement in which antenna arrays of different frequency bands are arranged respectively and then parallelly placed in the same plane. The antenna arrays are relatively more independent in the parallel coplanar arrangement comparing to other arrangements. Notching or filtering technology can be used to eliminate mutual coupling between antenna arrays for different frequency bands. However, this arrangement has a large antenna size, which does not meet the requirements of miniaturization. The interleaved arrangement is an arrangement in which antenna elements for different frequency bands are interleaved together. This arrangement can provide multi-dimensional freedom for beam control, but may be hard to achieve continuous scanning. The interleaved arrangement is mainly applied for patch antenna array, covering a relatively narrow bandwidth with limited application scenarios. From the parallel coplanar arrangement to the interleaved arrangement, the structure of the multi-band antenna array becomes compact, but not compact enough. The interplanted arrangement is proposed as a highly compact configuration. The high-frequency antenna array is arranged below and around the low-frequency antenna. Though this arrangement has a high degree of aperture-sharing, it also brings about serious cross-frequency mutual coupling between the high-frequency and low-frequency antenna arrays. For handling the mutual coupling, low-pass and high-resistance choke ring is introduced on the low-frequency antenna to suppress the induced high-frequency currents on the low-frequency antenna, thereby reducing the radiation interference from the low-frequency antenna on the high-frequency antenna. However, deterioration of radiation patterns caused by cross-frequency mutual coupling cannot be eliminated by the choke rings. Besides, the structure of the low-frequency antenna element is greatly damaged by loading the choke rings, which narrows the bandwidth of the low-frequency antenna. The last category is the stacked arrangement, in which the high-frequency antenna arrays are stacked over the low-frequency antenna array, exhibiting a high degree of compactness. The stacked arrangement of multi-band antenna array also leads to serious problems. The radiation performance of the high-frequency antenna greatly deteriorates because it is too high measured from the reflector. In order to solve this problem, the frequency selection surface or split PEC surface is inserted between the low-frequency antenna and the high-frequency antenna elements, which serves as the reflector for the high-frequency antenna elements. However, stacked arrangement may result in a large overall height, and thus a low-profile design of the low-frequency antenna is required, thereby increasing the design difficulty of aperture-shared antennas.

It can be seen that there are many challenges for the design of dual-band compact base station antennas if conventional decoupling methods are used.

SUMMARY OF THE INVENTION

To address the above-mentioned deficiencies in the prior art, the present disclosure proposes a dual-band aperture-shared antenna that is made up of a high-frequency antenna array and a low-frequency antenna, with the high-frequency antenna array being disposed beneath the low-frequency antenna. The first object of the present disclosure is to provide a new method for effective reducing the coupling effect on a dual-band aperture-shared antenna.

The second object of the present disclosure is to provide a dual-band aperture-shared antenna structure that can achieve effective decoupling.

To achieve the first object mentioned above, the present disclosure provides a method for aperture sharing a high-frequency antenna array and a low-frequency antenna. The method includes:
  providing a first dielectric substrate directly above a floor and providing a second dielectric substrate between the floor and the first dielectric substrate;
  dividing the first dielectric substrate into a first quadrant, a second quadrant, a third quadrant, and a fourth quadrant, by taking the center of the first dielectric substrate as the center; providing a first meta surface, a first radiation ring, a second radiation ring, and a second meta surface in the first quadrant, the second quadrant, the third quadrant, and the fourth quadrant of the top surface of the first dielectric substrate, respectively; providing a fourth radiation ring, a fourth meta surface, a third meta surface, and a third radiation ring in the first quadrant, the second quadrant, the third quadrant, and the fourth quadrant of the bottom surface of the first dielectric substrate, respectively; providing a first feedline corresponding to the first radiation ring and the third radiation ring in the middle of the bottom surface of the first dielectric substrate; and providing a second feedline corresponding to the second radiation ring and the fourth radiation ring in the middle of the top surface of the first dielectric substrate;

providing a first coaxial line and a second coaxial line for connecting a low-frequency feeding network, where an inner core of the first coaxial line is connected to the first feedline, the outer conductor of the first coaxial line is connected to the first radiation ring, the inner core of the second coaxial line is connected to the second feedline, the outer conductor of the second coaxial line is connected to the fourth radiation ring;

providing two symmetrically arranged first high-frequency antenna elements on the top surface of the second dielectric substrate, providing a third feedline between the two first high-frequency antenna elements, providing two symmetrically arranged second high-frequency antenna elements on the bottom surface of the second dielectric substrate, providing a fourth feedline between the two second high-frequency antenna elements, and a symmetrical line of the two first high-frequency antenna elements is perpendicular to the symmetrical line of the two second high-frequency antenna elements; and providing a third coaxial line and a fourth coaxial line for connecting a high-frequency network, where an inner core of the third coaxial line is connected to the third feedline, the outer conductor of the third coaxial line is connected to the second high-frequency antenna element, an inner core of the fourth coaxial line is connected to the fourth feedline, and an outer conductor of the fourth coaxial line is connected to the first high-frequency antenna element.

As a further improvement, the first radiation ring, the second radiation ring, the third radiation ring, and the fourth radiation ring have the same structure and are uniformly arranged around the center of the first dielectric substrate in the second quadrant, the third quadrant, the fourth quadrant, and the first quadrant, respectively; the first meta surface, the second meta surface, the third meta surface, and the fourth meta surface have the same structure and are uniformly arranged around the center of the first dielectric substrate in the first quadrant, the fourth quadrant, the third quadrant, and the second quadrant, respectively.

Further, the first radiation ring has a sector structure.

Further, the first meta surface has a square structure and includes a plurality of first meta surface units arranged in a +45° direction, and a plurality of second meta surface units arranged in a 90° direction are provided on a side, away from the first radiation ring, of the first meta surface, and on a side away from the second meta surface, of the first meta surface, respectively.

Further, the first high-frequency antenna elements and the second high-frequency antenna elements have the same structure, and the first high-frequency antenna elements include two symmetrically arranged arc-shaped portions and a connecting portion connecting the two arc-shaped portions, where the connecting portion is in the middle of the second dielectric substrate and the two arc-shaped portions are located on the same circumferential track.

To achieve the second object mentioned above, the present disclosure provides a dual-band aperture-shared antenna structure. The antenna structure includes a floor, high-frequency antenna radiator arranged directly above the floor, and a low-frequency antenna radiator arranged directly above the high-frequency antenna radiator. The low-frequency antenna radiator includes a first dielectric substrate, a first radiation ring, a second radiation ring, a third radiation ring, a fourth radiation ring, a first meta surface, a second meta surface, a third meta surface, a fourth meta surface, a first coaxial line, and a second coaxial line. The first dielectric substrate is divided into a first quadrant, a second quadrant, a third quadrant, and a fourth quadrant by taking the center of the first dielectric substrate as the center. The first radiation ring, the second radiation ring, the third radiation ring, and the fourth radiation ring have the same structure and are uniformly arranged around the center of the first dielectric substrate in the second quadrant, the third quadrant, the fourth quadrant, and the first quadrant, respectively; the first meta surface, the second meta surface, the third meta surface, and the fourth meta surface have the same structure and are uniformly arranged around the center of the first dielectric substrate in the first quadrant, the fourth quadrant, the third quadrant, and the second quadrant, respectively. The first radiation ring, the second radiation ring, the first meta surface, and the second meta surface are located on the top surface of the first dielectric substrate; the third radiation ring, the fourth radiation ring, the third meta surface, and the fourth meta surface are located on the bottom surface of the first dielectric substrate. A first feedline corresponding to the first radiation ring and the third radiation ring is provided in the middle of the bottom surface of the first dielectric substrate, and a second feedline corresponding to the second radiation ring and the fourth radiation ring is provided in the middle of the top surface of the first dielectric substrate. An inner core of the first coaxial line is connected to the first feedline, an outer conductor of the first coaxial line is connected to the first radiation ring, an inner core of the second coaxial line is connected to the second feedline, and an outer conductor of the second coaxial line is connected to the fourth radiation ring. Lower ends of the first coaxial line and the second coaxial line pass downward through the high-frequency antenna radiator and the floor.

As a further improvement, the first radiation ring has a sector structure.

Further, the first meta surface has a square structure and includes a plurality of first meta-surface units arranged in a +45° direction, and a plurality of second meta-surface units arranged in a 90° direction are provided on a side, away from the first radiation ring, of the first meta surface, and on a side, away from the second meta surface, of the first meta surface, respectively.

Further, the high-frequency antenna radiator includes a second dielectric substrate, two first high-frequency antenna elements symmetrically arranged on the top surface of the second dielectric substrate, a third coaxial line corresponding to the first high-frequency antenna elements, two second high-frequency antenna elements symmetrically arranged on the bottom surface of the second dielectric substrate, and a fourth coaxial line corresponding to the second high-frequency antenna element. The first high-frequency antenna elements and the second high-frequency antenna elements have the same structure. The first high-frequency antenna elements include two symmetrically arranged arc-shaped portions and a connecting portion connecting the two arc-shaped portions. The connecting portion is in the middle of the second dielectric substrate and the two arc-shaped portions are located on the same circumferential track. A third feedline is provided between the two first high-frequency antenna elements, where an inner core of the third coaxial line is connected to the third feedline and an outer conductor of the third coaxial line is connected to the second high-frequency antenna element. A fourth feedline is provided between the two second high-frequency antenna elements, where an inner core of the fourth coaxial line is connected to the fourth feedline and an outer conductor of the fourth coaxial line is connected to the first high-frequency antenna element. Lower ends of the third coaxial line and the fourth coaxial line pass downward through the floor. A symmetry line between the two first high-frequency antenna elements is perpendicular to a symmetry line between the two second high-frequency antenna elements.

Further, the first dielectric substrate, the second dielectric substrate, and the floor are all square structures. An area of the first dielectric substrate is greater than that of the second dielectric substrate and an angle between an edge of the first dielectric substrate and an edge of the second dielectric substrate is 45°.

Beneficial Effects

The present disclosure has the following advantages compared to the prior art.
(1) The low-frequency antenna of the present disclosure covers a frequency range from 690 MHz to 960 MHz and each high-frequency antenna element covers a frequency range from 1.7 GHz to 2.7 GHz, which is suitable to be applied to 2G/3G/LTE (4G) systems as well as 5G systems using a Sub 6 GHz frequency band. By introducing a meta surface on the low-frequency antenna, the radiation performance of the high-frequency antenna element, which was deteriorated due to the mutual coupling between the low-frequency antenna and the high-frequency antenna array, particularly the shielding effect caused by the low-frequency antenna on the high-frequency antenna elements, is obviously improved. At the same time, the radiation performance and impedance performance of the low-frequency antenna will not be affected. In this way, a good dual-band aperture-sharing effect as well as two wide frequency bandwidths can be achieved.
(2) The antenna structure of the present disclosure is simple. A meta surface is directly embedded into the low-frequency antenna radiator, which reduces the complexity of the structure. The high-frequency antenna elements are integrated below the low-frequency antennas, which enables a high integration.
(3) The antenna of the present disclosure has a compact structure, which can achieve the aperture-sharing of the low-frequency antenna and high-frequency antenna array within a smaller antenna size or aperture.

BRIEF DESCRIPTION OF THE DRAWINGS

FIG. 10 is a gain diagram of a high-frequency antenna radiator according to the present disclosure.
Where: 1—floor, 2—second dielectric substrate, 3—first dielectric substrate, 4—first meta surface, 5—second meta surface, 6—third meta surface, 7—fourth meta surface, 8—first radiation ring, 9—second radiation ring, 10—third radiation ring, 11—fourth radiation ring, 12—first feedline, 13—second feedline, 14—third feedline, 15—fourth feedline, 16—first coaxial line, 17—second coaxial line, 18—third coaxial line, 19—fourth coaxial line, 20—first high-frequency antenna element, 21—second high-frequency antenna element, 22—first meta-surface unit, 23—second meta-surface unit, 24—arc-shaped portion, 25—connecting portion, and 26—metalized via.

DETAILED DESCRIPTION OF THE EMBODIMENTS

The present disclosure will now be further described with reference to specific embodiments in the accompanying drawings.

With reference to FIGS. 1 to 10, an aperture-sharing method for a dual-band aperture-shared antenna is as follows.

Figure 1:
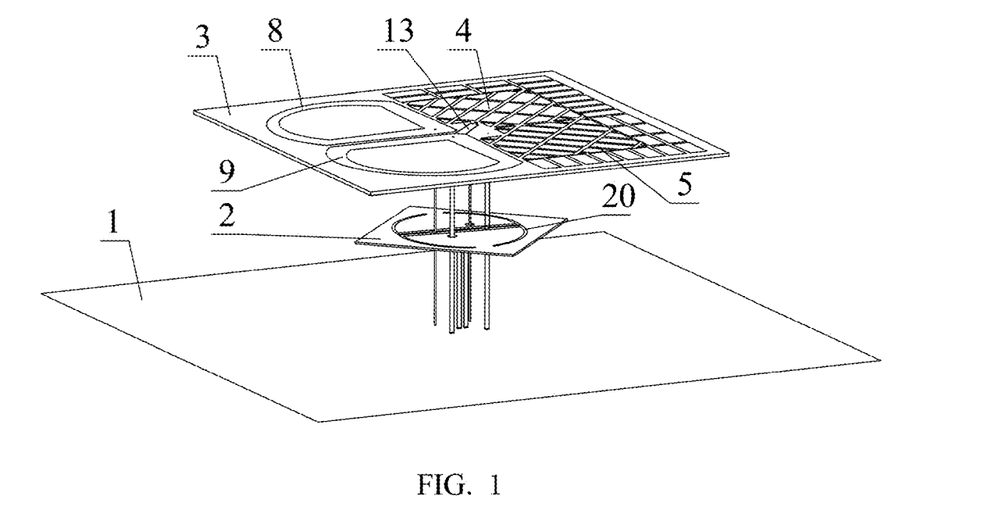
FIG. 1 is a schematic diagram of a stereoscopic structure of the present disclosure.
Figure 4:
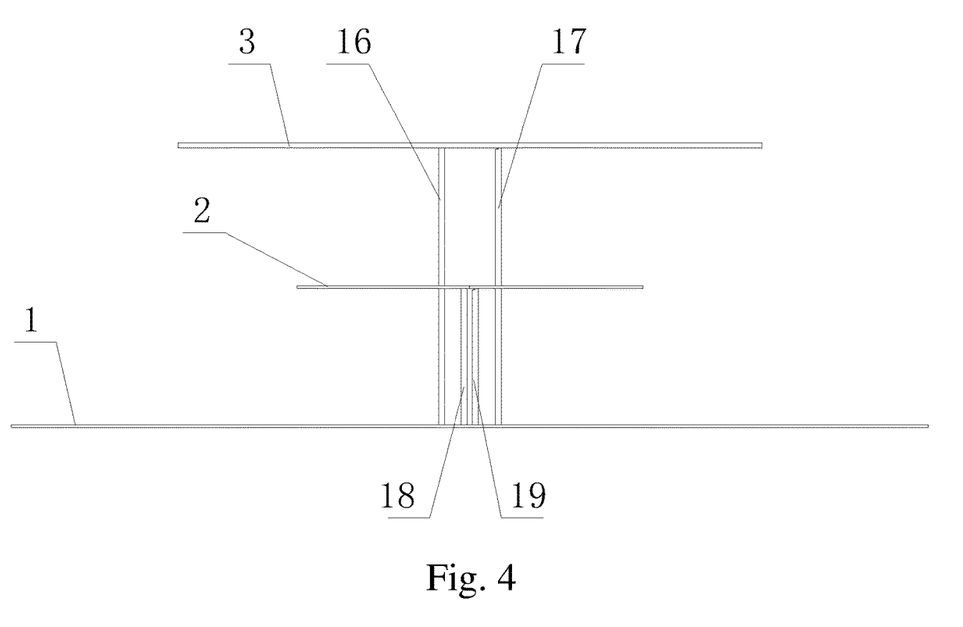
FIG. 4 is a schematic front diagram of the present disclosure.

A first dielectric substrate 3 is provided directly above a floor 1, and a second dielectric substrate 2 is provided between the floor 1 and the first dielectric substrate 3.

Figure 2:
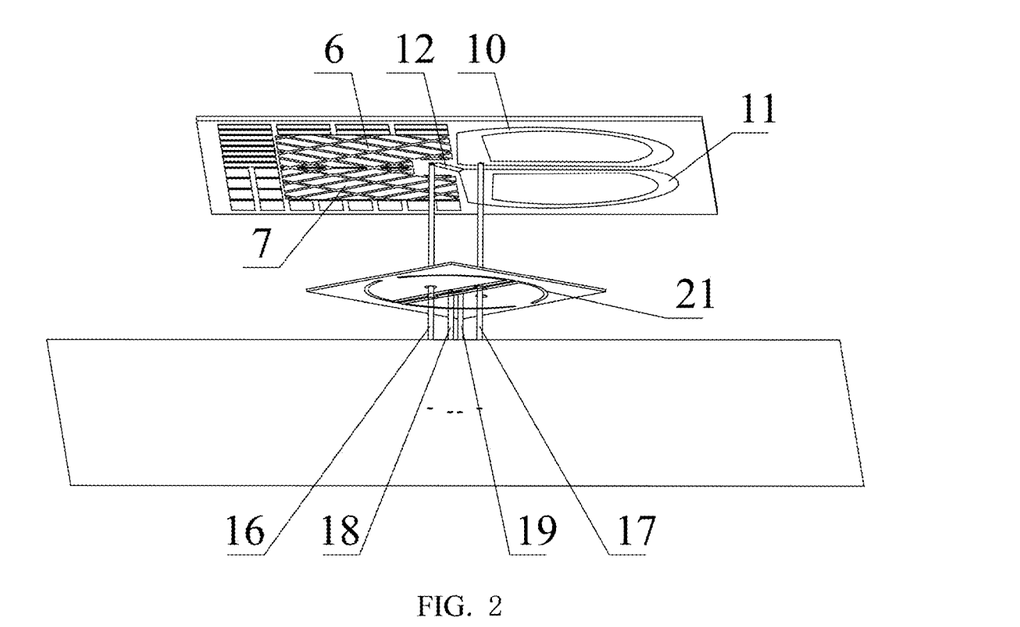
FIG. 2 is a schematic diagram of a bottom structure of the present disclosure.
Figure 3:
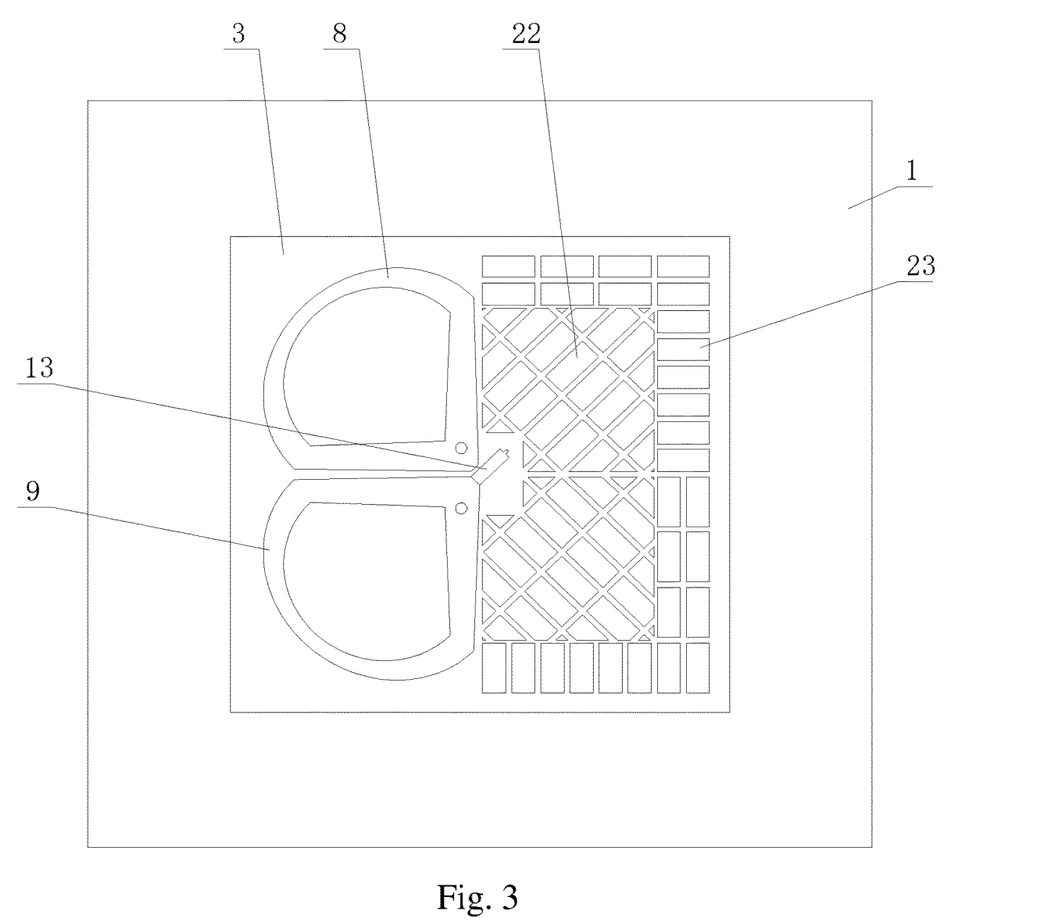
FIG. 3 is a schematic top diagram of a first dielectric substrate according to the present disclosure.

The first dielectric substrate 3 is divided into a first quadrant, a second quadrant, a third quadrant, and a fourth quadrant by taking the center of the first dielectric substrate as the center. A first meta surface 4, a first radiation ring 8, a second radiation ring 9, and a second meta surface 5 are provided in the first quadrant, the second quadrant, the third quadrant, and the fourth quadrant of the top surface of the first dielectric substrate 3, respectively; a fourth radiation ring 11, a fourth meta surface 7, a third meta surface 6, and a third radiation ring 10 are provided in the first quadrant, the second quadrant, the third quadrant, and the fourth quadrant of the bottom surface of the first dielectric substrate 3, respectively. A first feedline 12 corresponding to the first radiation ring 8 and the third radiation ring 10 is provided in the middle of the bottom surface of the first dielectric substrate 3, and a second feedline 13 corresponding to the second radiation ring 9 and the fourth radiation ring 11 is provided in the middle of the top surface of the first dielectric substrate 3.

A first coaxial line 16 and a second coaxial line 17 for connecting a low-frequency network are provided, where an inner core of the first coaxial line 16 is connected to the first feedline 12, an outer conductor of the first coaxial line 16 is connected to the first radiation ring 8, an inner core of the second coaxial line 17 is connected to the second feedline 13, an outer conductor of the second coaxial line 17 is connected to the fourth radiation ring 11, the first feedline 12 is electrically connected to the third radiation ring 10, and the second feedline 13 is electrically connected to the second radiation ring 9.

Figure 5:
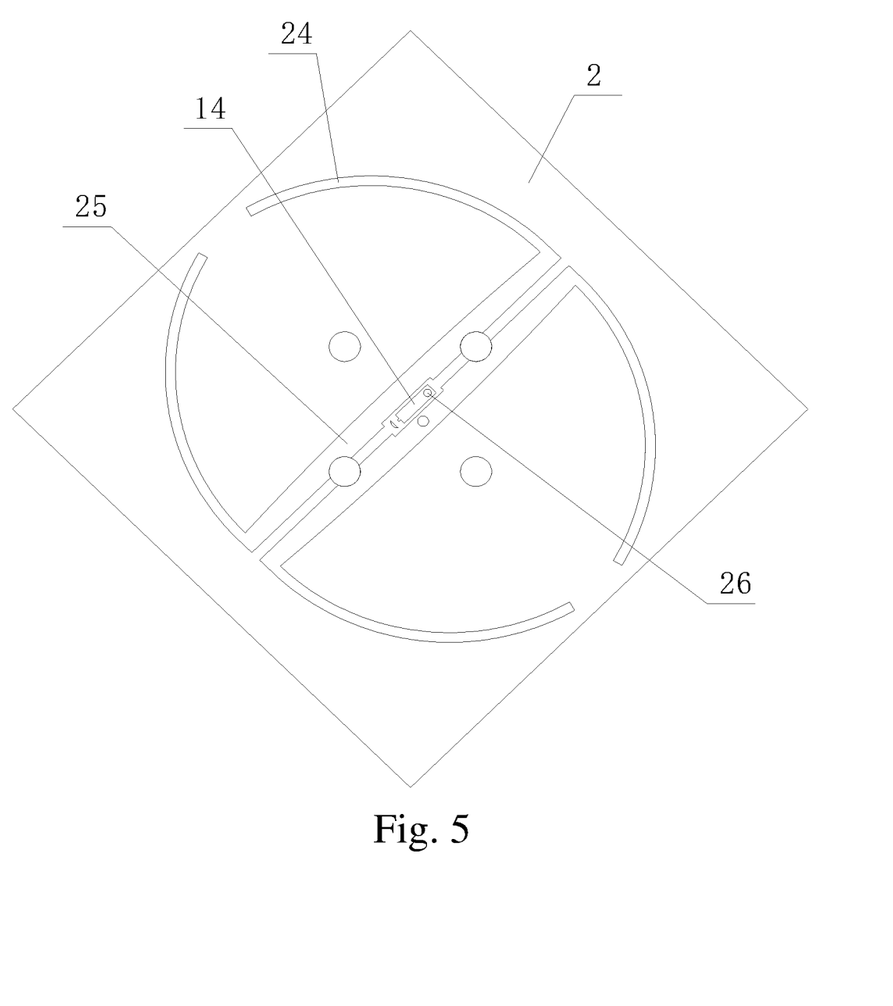
FIG. 5 is a schematic diagram of the structure of a top surface of a second dielectric substrate according to the present disclosure.
Figure 6:
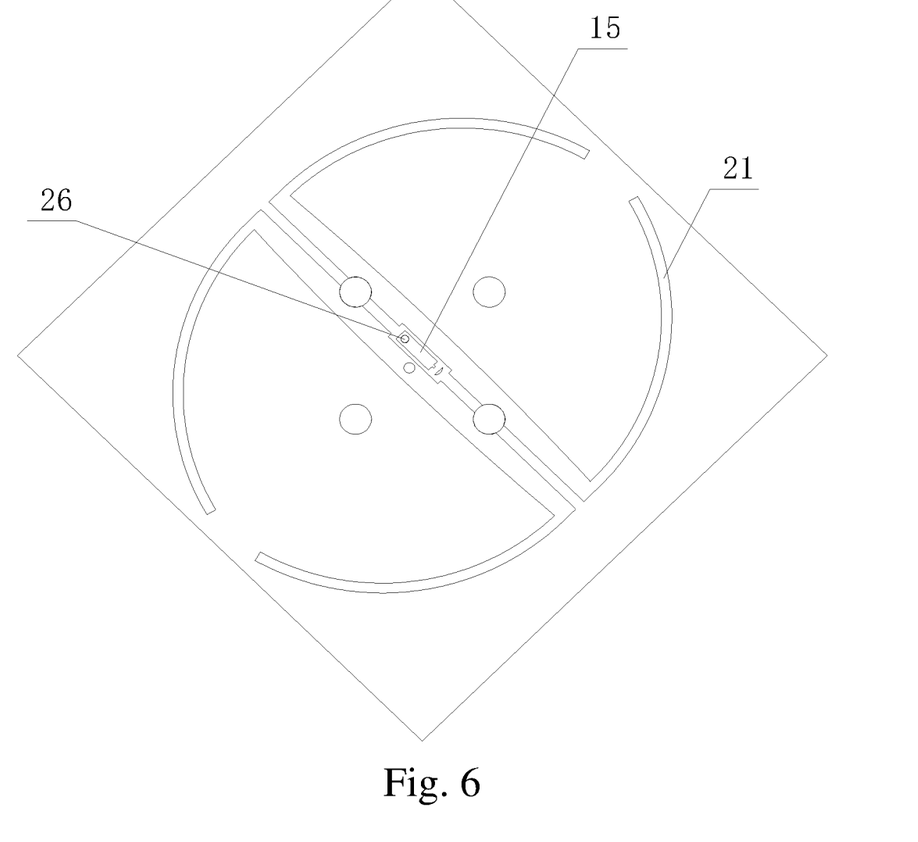
FIG. 6 is a schematic diagram of the structure of a bottom surface of a second dielectric substrate according to the present disclosure.

Two symmetrically arranged first high-frequency antenna elements 20 are provided on the top surface of the second dielectric substrate 2, and a third feedline 14 is provided between the two first high-frequency antenna elements 20. Two symmetrically arranged second high-frequency antenna elements 21 are provided on the bottom surface of the second dielectric substrate 2, and a fourth feedline 15 is provided between the two second high-frequency antenna elements 21. A symmetrical line between the two first high-frequency antenna elements 20 is perpendicular to a symmetrical line between the two second high-frequency antenna elements 21.

A third coaxial line 18 and a fourth coaxial line 19 for connecting a high-frequency network are provided, where an inner core of the third coaxial line 18 is connected to the third feedline 14, an outer conductor of the third coaxial line 18 is connected to the second high-frequency antenna elements 21, an inner core of the fourth coaxial line 19 is connected to the fourth feedline 15, and an outer conductor of the fourth coaxial line 19 is connected to the first high-frequency antenna elements 20.

A dual-band aperture-shared antenna structure includes a floor 1, a high-frequency antenna radiator arranged directly above the floor 1, and a low-frequency antenna radiator arranged directly above the high-frequency antenna radiator. The low-frequency antenna radiator includes a first dielectric substrate 3, a first radiation ring 8, a second radiation ring 9, a third radiation ring 10, a fourth radiation ring 11, a first meta surface 4, a second meta surface 5, a third meta surface 6, a fourth meta surface 7, a first coaxial line 16, and a second coaxial line 17. The first dielectric substrate 3 is divided into a first quadrant, a second quadrant, a third quadrant, and a fourth quadrant by taking the center of the first dielectric substrate as the center. The first radiation ring 8, the second radiation ring 9, the third radiation ring 10, and the fourth radiation ring 11 have a same structure and are uniformly arranged around the center of the first dielectric substrate 3 in the second quadrant, the third quadrant, the fourth quadrant, and the first quadrant, respectively. The first radiation ring 8, the second radiation ring 9, the third radiation ring 10, and the fourth radiation ring 11 have annular array structures. The first meta surface 4, the second meta surface 5, the third meta surface 6, and the fourth meta surface 7 have the same structure and are arranged uniformly around the center of the first dielectric substrate 3 in the first quadrant, the fourth quadrant, the third quadrant, and the second quadrant, respectively. The first meta surface 4, the second meta surface 5, the third meta surface 6, and the fourth meta surface 7 have annular array structures. The first radiation ring 8, the second radiation ring 9, the first meta surface 4, and the second meta surface 5 are located on the top surface of the first dielectric substrate 3; the third radiation ring 10, the fourth radiation ring 11, the third meta surface 6, and the fourth meta surface 7 are located on the bottom surface of the first dielectric substrate 3. A first feedline 12 corresponding to the first radiation ring 8 and the third radiation ring 10 is provided in the middle of the bottom surface of the first dielectric substrate 3; a second feedline 13 corresponding to the second radiation ring 9 and the fourth radiation ring 11 is provided in the middle of the top surface of the first dielectric substrate 3. An inner core of the first coaxial line 16 is connected to the first feedline 12, an outer conductor of the first coaxial line 16 is connected to the first radiation ring 8. An inner core of the second coaxial line 17 is connected to the second feedline 13, and an outer conductor of the second coaxial line 17 is connected to the fourth radiation ring 11. Lower ends of the first coaxial line 16 and the second coaxial line 17 pass downward through the high-frequency antenna radiator and the floor 1. The first feedline 12 is electrically connected to the third radiation ring 10 and the second feedline 13 is electrically connected to the second radiation ring 9.

In this embodiment, the first radiation ring 8 has a sector structure. The first meta surface 4 has a square structure and includes a plurality of first meta-surface units 22 arranged in a +45° direction, and a plurality of second meta-surface units 23 arranged in a 90° direction are provided on a side, away from the first radiation ring 8, of the first meta surface 4 and on a side, away from the second meta surface 5, of the first meta surface 4, respectively. The first meta-surface units 22 and the second meta-surface units 23 both take the first quadrant as reference.

The high-frequency antenna radiator includes a second dielectric substrate 2, two first high-frequency antenna elements 20 symmetrically arranged on the top surface of the second dielectric substrate 2, a fourth coaxial line 19 corresponding to the first high-frequency antenna elements 20, two second high-frequency antenna elements 21 symmetrically arranged on the bottom surface of the second dielectric substrate 2, and a third coaxial line 18 corresponding to the second high-frequency antenna elements 21. The first high-frequency antenna elements 20 and the second high-frequency antenna elements 21 have the same structure. The first high-frequency antenna elements 20 include two symmetrically arranged arc-shaped portions 24 and a connecting portion 25 connecting the two arc-shaped portions 24, where the connecting portion 25 is in the middle of the second dielectric substrate 2 and the two arc-shaped portions 24 are located on the same circumferential track. A third feedline 14 is provided between the two first high-frequency antenna elements 20, where an inner core of the third coaxial line 18 is connected to the third feedline 14 and an outer conductor of the third coaxial line 18 is connected to the second high-frequency antenna elements 21. A fourth feedline 15 is provided between the two second high-frequency antenna elements 21, where an inner core of the fourth coaxial line 19 is connected to the fourth feedline 15 and an outer conductor of the fourth coaxial line 19 is connected to the first high-frequency antenna elements 20. Lower ends of the third coaxial line 18 and the fourth coaxial line 19 pass downward through the floor 1. A symmetrical line between the two first high-frequency antenna elements 20 is perpendicular to a symmetrical line between the two second high-frequency antenna elements 21. In particular, by taking the quadrants of the first dielectric substrate 3 as reference, the two arc-shaped portions 24 of the first high-frequency antenna elements 20 are symmetrical in the +45° direction, and the two arc-shaped portions 24 of the second high-frequency antenna elements 21 are symmetrical in the −45° direction.

The third feedline 14 is provided with a metalized via 26 corresponding to the third coaxial line 18, and the fourth feedline 15 is provided with a metalized via 26 corresponding to the fourth coaxial line 19.

The first dielectric substrate 3, the second dielectric substrate 2, and the floor 1 are all square structures. An area of the first dielectric substrate 3 is greater than that of the second dielectric substrate 2 and an angle between an edge of the first dielectric substrate 3 and an edge of the second dielectric substrate 2 is 45°.

The first feedline 12 and the second feedline 13 which are orthogonally arranged to each other, as well as the third feedline 14 and the fourth feedline 15 which are orthogonally arranged to each other, are configured to excite a +45° polarization and a −45° polarization of antennas, and the antennas are fed with coaxial lines.

In this embodiment, the dielectric substrate 3 and the second dielectric substrate 2 all adopt a high-frequency Rogers 4350B substrate with a thickness of 0.76 mm and a relative dielectric constant of 3.48. The antenna radiators have a planar structure, which can realize dual-polarized bandwidths of 690 MHz-960 MHz and 1.7 GHz-2.7 GHz, and the return loss is greater than 10 dB.

Figure 7:
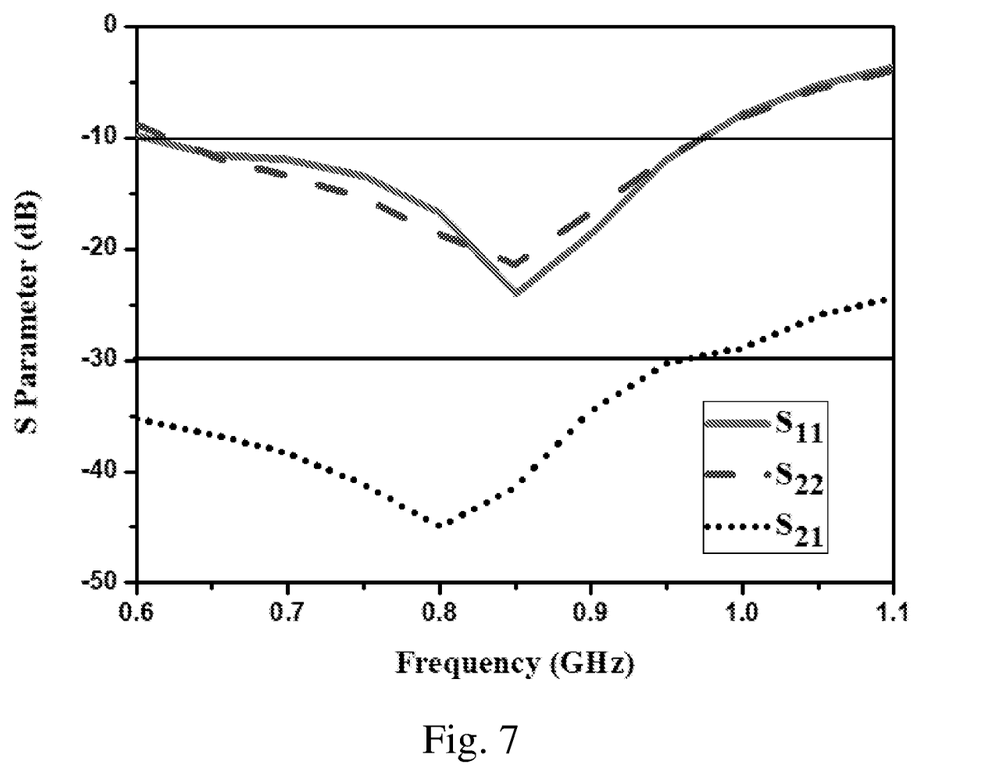
FIG. 7 is a diagram of an impedance bandwidth of a low-frequency antenna radiator according to the present disclosure.

FIG. 7 is a diagram of an impedance bandwidth of a low-frequency antenna radiator according to the present embodiment. It can be seen from FIG. 7 that the low-frequency antenna radiator of the present disclosure has an impedance bandwidth of 690 MHz to 960 MHz, a return loss of 10 dB, and an isolation of more than 30 dB over the bandwidth.

Figure 8:
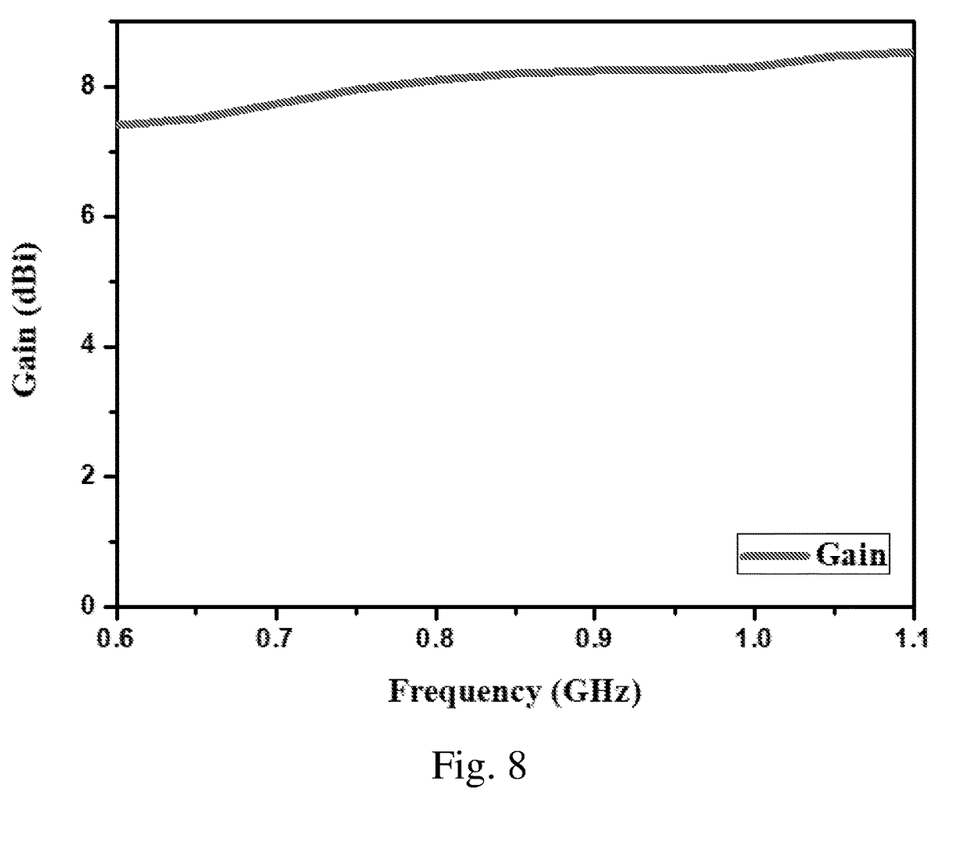
FIG. 8 is a gain diagram of a low-frequency antenna radiator according to the present disclosure.

FIG. 8 is a gain diagram of a low-frequency antenna radiator according to the present embodiment. It can be seen from FIG. 8 that an in-band gain of the low-frequency antenna radiator of the present disclosure is substantially more than 8 dBi.

Figure 9:
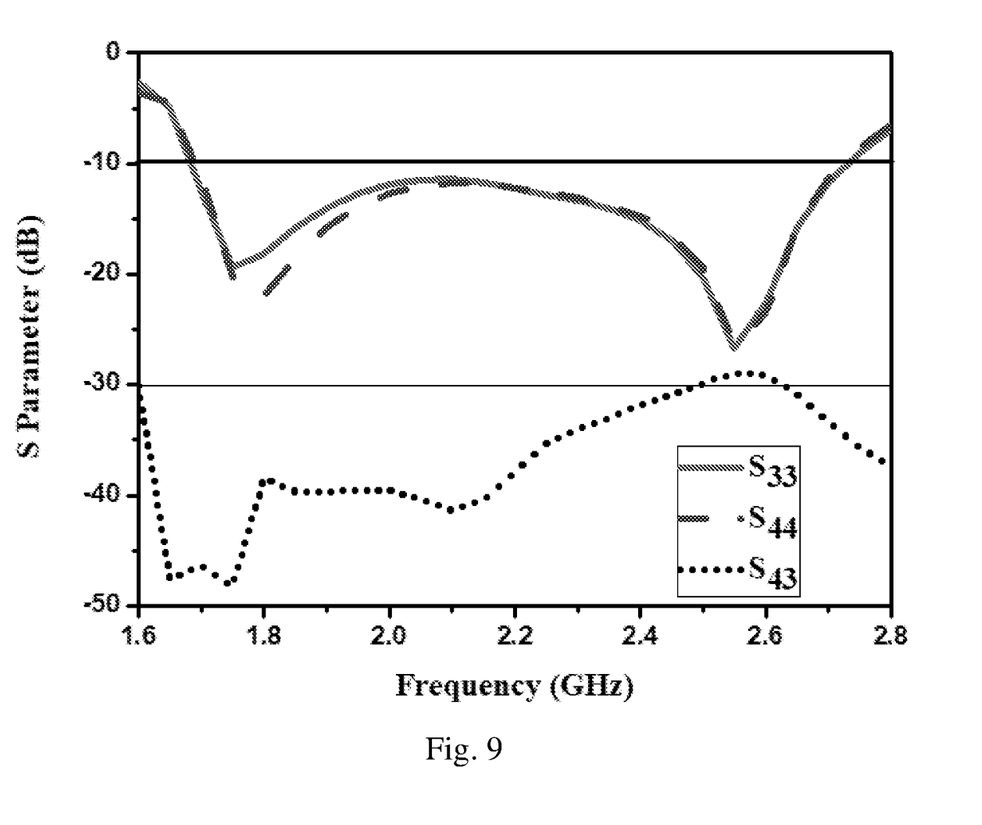
FIG. 9 is a diagram of an impedance bandwidth of a high-frequency antenna radiator according to the present disclosure.

FIG. 9 is a diagram of an impedance bandwidth of a high-frequency antenna radiator according to the present embodiment. It can be seen from FIG. 9 that the high-frequency antenna radiator of the present disclosure has an impedance bandwidth of 1.7 GHz to 2.7 GHz, a return loss of 10 dB, and an isolation of more than 30 dB over the bandwidth.

Figure 10:
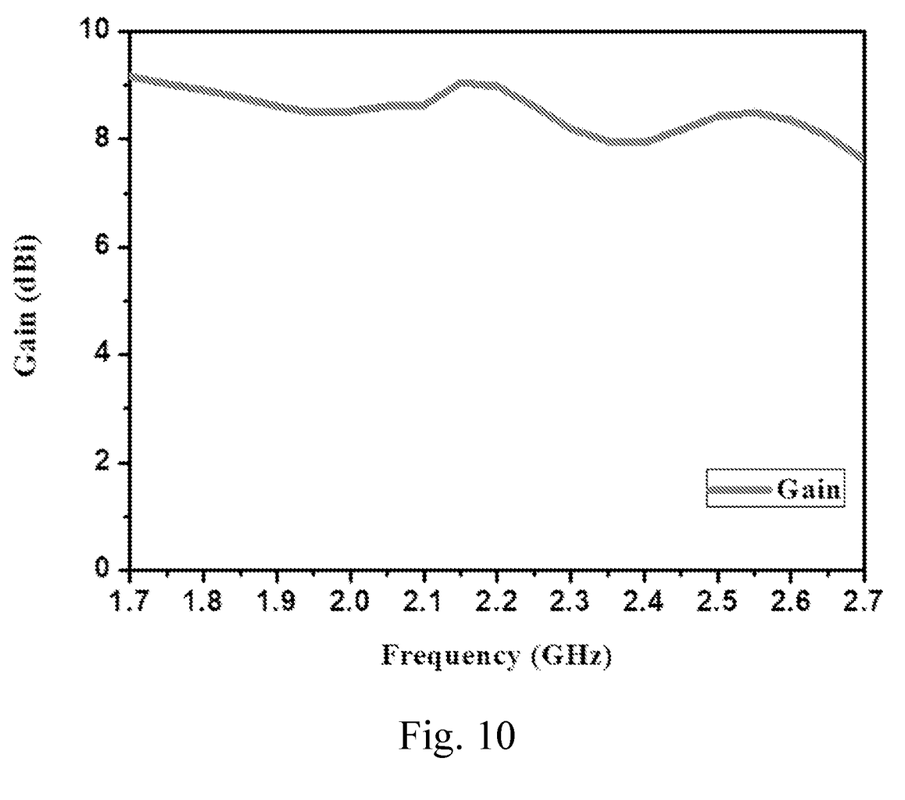

FIG. 10 is a gain diagram of a high-frequency antenna radiator according to the present embodiment. It can be seen from FIG. 10 that an in-band gain of the high-frequency antenna radiator of the present disclosure is substantially more than 8 dBi.

The low-frequency antenna of the present disclosure covers a frequency range from 690 MHz to 960 MHz and each high-frequency antenna element covers a frequency range from 1.7 GHz to 2.7 GHz, which is suitable to be applied for 2G/3G/LTE (4G) systems. By introducing a meta surface on the low-frequency antenna, the radiation performance of the high-frequency antenna element, which was deteriorated due to the mutual coupling between the low-frequency antenna and the high-frequency antenna array, particularly the shielding effect caused by the low-frequency antenna on the high-frequency elements, is obviously improved. At the same time, the radiation performance of the low-frequency antenna will not be affected. In this way, a good dual-band aperture-sharing effect as well as two wide frequency bandwidths can be achieved. The antenna structure according to the present disclosure is simple. By directly embedding a meta surface into a low-frequency antenna radiator, a high integration can be achieved, and the complexity of the structure is reduced. The antenna of the present disclosure has a compact structure, which enables dual-band aperture-sharing of the low-frequency antenna and high-frequency antenna array within a smaller antenna size or aperture.

While the foregoing is directed to the preferred embodiments of the present disclosure, it will be understood by those skilled in the art that various changes and modifications may be made without departing from the spirit and scope of the disclosure, which will not affect the effects of embodiments of the present disclosure and the utility of the patent.

The invention claimed is:

1. A aperture-sharing method for a dual-band aperture-shared antenna, comprising:
    providing a first dielectric substrate directly above a floor and providing a second dielectric substrate between the floor and the first dielectric substrate;
    dividing the first dielectric substrate into a first quadrant, a second quadrant, a third quadrant, and a fourth quadrant, by taking the center of the first dielectric substrate as the center; providing a first meta surface, a first radiation ring, a second radiation ring, and a second meta surface in the first quadrant, the second quadrant, the third quadrant, and the fourth quadrant of the top surface of the first dielectric substrate, respectively; providing a fourth radiation ring, a fourth meta surface, a third meta surface, and a third radiation ring in the first quadrant, the second quadrant, the third quadrant, and the fourth quadrant of the bottom surface of the first dielectric substrate, respectively; providing a first feedline in association with the first radiation ring and the third radiation ring in the middle of the bottom surface of the first dielectric substrate; and providing a second feedline in association with the second radiation ring and the fourth radiation ring in the middle of the top surface of the first dielectric substrate;
    providing a first coaxial line and a second coaxial line for connecting a low-frequency network, wherein an inner core of the first coaxial line is connected to the first feedline, an outer conductor of the first coaxial line is connected to the first radiation ring, an inner core of the second coaxial line is connected to the second feedline, and an outer conductor of the second coaxial line is connected to the fourth radiation ring;
    providing two first high-frequency antenna elements that are symmetrically arranged, on the top surface of the second dielectric substrate, providing a third feedline between the two first high-frequency antenna elements, providing two second high-frequency antenna elements that are symmetrically arranged, on the bottom surface of the second dielectric substrate, providing a fourth feedline between the two second high-frequency antenna elements, and a symmetrical line between the two first high-frequency antenna elements being perpendicular to a symmetrical line between the two second high-frequency antenna elements; and
    providing a third coaxial line and a fourth coaxial line for connecting a high-frequency network, wherein an inner core of the third coaxial line is connected to the third feedline, an outer conductor of the third coaxial line is connected to the second high-frequency antenna elements, an inner core of the fourth coaxial line is connected to the fourth feedline, and an outer conductor of the fourth coaxial line is connected to the first high-frequency antenna elements.

2. The aperture-sharing method for a dual-band aperture-shared antenna according to claim 1, wherein the first radiation ring, the second radiation ring, the third radiation ring, and the fourth radiation ring are identical in structure and are uniformly arranged around the center of the first dielectric substrate in the second quadrant, the third quadrant, the fourth quadrant, and the first quadrant, respectively; the first meta surface, the second meta surface, the third meta surface, and the fourth meta surface are identical in structure and uniformly arranged around the center of the first dielectric substrate in the first quadrant, the fourth quadrant, the third quadrant, and the second quadrant, respectively.

3. The aperture-sharing method for a dual-band aperture-shared antenna according to claim 2, wherein the first radiation ring has a sector structure.

4. The aperture-sharing method for a dual-band aperture-shared antenna according to claim 2, wherein the first meta surface has a square structure and comprises a plurality of first meta-surface units arranged in a +45° direction, and wherein a plurality of second meta-surface units arranged in a 90° direction are provided on a side, away from the first radiation ring, of the first meta surface and on a side, away from the second meta surface, of the first meta surface.

5. The aperture-sharing method for a dual-band aperture-shared antenna according to claim 1,
wherein the first high-frequency antenna elements and the second high-frequency antenna elements are identical in structure, and the first high-frequency antenna elements comprise two arc-shaped portions that are symmetrically arranged and a connecting portion connecting the two arc-shaped portions,
wherein the connecting portion is in the middle of the second dielectric substrate and the two arc-shaped portions are located on the same circumferential track.

6. A dual-band aperture-shared antenna structure, comprising a floor, a high-frequency antenna radiator arranged directly above the floor, and a low-frequency antenna radiator arranged directly above the high-frequency antenna radiator,
wherein the low-frequency antenna radiator comprises a first dielectric substrate, a first radiation ring, a second radiation ring, a third radiation ring, a fourth radiation ring, a first meta surface, a second meta surface, a third meta surface, a fourth meta surface, a first coaxial line, and a second coaxial line,
wherein the first dielectric substrate is divided into a first quadrant, a second quadrant, a third quadrant, and a fourth quadrant by taking the center of the first dielectric substrate as the center; the first radiation ring, the second radiation ring, the third radiation ring, and the fourth radiation ring are identical in structure and uniformly arranged around the center of the first dielectric substrate in the second quadrant, the third quadrant, the fourth quadrant, and the first quadrant, respectively; the first meta surface, the second meta surface, the third meta surface, and the fourth meta surface are identical in structure and uniformly arranged around the center of the first dielectric substrate in the first quadrant, the fourth quadrant, the third quadrant, and the second quadrant, respectively; the first radiation ring, the second radiation ring, the first meta surface, and the second meta surface are located on the top surface of the first dielectric substrate; the third radiation ring, the fourth radiation ring, the third meta surface, and the fourth meta surface are located on the bottom surface of the first dielectric substrate; a first feedline in association with the first radiation ring and the third radiation ring is provided in the middle of the bottom surface of the first dielectric substrate; a second feedline in association with the second radiation ring and the fourth radiation ring is provided in the middle of the top surface of the first dielectric substrate; an inner core of the first coaxial line is connected to the first feedline, an outer conductor of the first coaxial line is connected to the first radiation ring, an inner core of the second coaxial line is connected to the second feedline, and an outer conductor of the second coaxial line is connected to the fourth radiation ring; and lower ends of the first coaxial line and the second coaxial line pass downward through the high-frequency antenna radiator and the floor.

7. The dual-band aperture-shared antenna structure according to claim 6, wherein the first radiation ring has a sector structure.

8. The dual-band aperture-shared antenna structure according to claim 6, wherein the first meta surface has a square structure and comprises a plurality of first meta-surface units arranged in a +45° direction, and wherein a plurality of second meta-surface units arranged in a 90° direction are provided on a side, away from the first radiation ring, of the first meta surface and on a side, away from the second meta surface of the first meta surface, respectively.

9. The dual-band aperture-shared antenna structure according to claim 6, wherein the high-frequency antenna radiator comprises a second dielectric substrate, two first high-frequency antenna elements symmetrically arranged on the top surface of the second dielectric substrate, a third coaxial line in association with the first high-frequency antenna elements, two second high-frequency antenna elements symmetrically arranged on the bottom surface of the second dielectric substrate, and a fourth coaxial line in association with the second high-frequency antenna elements, wherein the first high-frequency antenna elements and the second high-frequency antenna elements are identical in structure, and the first high-frequency antenna elements comprise two arc-shaped portions that are symmetrically arranged and a connecting portion connecting the two arc-shaped portions, wherein the connecting portion is in the middle of the second dielectric substrate and the two arc-shaped portions are located on the same circumferential track; a third feedline is provided between the two first high-frequency antenna elements, wherein an inner core of the third coaxial line is connected to the third feedline and an outer conductor of the third coaxial line is connected to the second high-frequency antenna elements; a fourth feedline is provided between the two second high-frequency antenna elements, wherein an inner core of the fourth coaxial line is connected to the fourth feedline and an outer conductor of the fourth coaxial line is connected to the first high-frequency antenna elements; lower ends of the third coaxial line and the fourth coaxial line pass downward through the floor; and a symmetrical line between the two first high-frequency antenna elements is perpendicular to a symmetrical line between the two second high-frequency antenna elements.

10. The dual-band aperture-shared antenna structure according to claim 9, wherein the first dielectric substrate, the second dielectric substrate, and the floor each has a square structure, an area of the first dielectric substrate is greater than that of the second dielectric substrate, and an angle between an edge of the first dielectric substrate and an edge of the second dielectric substrate is 45°.

* * * * *